United States Patent
Kojima et al.

(10) Patent No.: US 10,118,534 B2
(45) Date of Patent: Nov. 6, 2018

(54) IRRADIATION APPARATUS

(71) Applicant: TOYOTA JIDOSHA KABUSHIKI KAISHA, Toyota-shi, Aichi-ken (JP)

(72) Inventors: Shin-ichi Kojima, Nagakute (JP); Keiichi Shimaoka, Nagakute (JP); Toshihiko Tsukada, Nagakute (JP); Kazuya Asaoka, Seto (JP); Sho Masuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 385 days.

(21) Appl. No.: 14/681,692

(22) Filed: Apr. 8, 2015

(65) Prior Publication Data

US 2015/0291081 A1 Oct. 15, 2015

(30) Foreign Application Priority Data

Apr. 15, 2014 (JP) .................................. 2014-083931

(51) Int. Cl.
*B60Q 1/08* (2006.01)
*B60Q 1/14* (2006.01)

(52) U.S. Cl.
CPC ............. *B60Q 1/085* (2013.01); *B60Q 1/143* (2013.01); *B60Q 2300/056* (2013.01); *B60Q 2300/45* (2013.01)

(58) Field of Classification Search
CPC .......... B60Q 2300/42; B60Q 2300/056; B60Q 1/143; B60Q 2300/41; B60Q 2300/45; B60Q 1/1423; B60Q 1/14; B60Q 1/1415
See application file for complete search history.

(56) References Cited

U.S. PATENT DOCUMENTS 4,286,308 A * 8/1981 Wolff .................. F21S 48/1136
362/19
5,379,196 A * 1/1995 Kobayashi ............. B60Q 1/085
362/283

(Continued)

FOREIGN PATENT DOCUMENTS

EP           2292464 A1    3/2011
JP        2008273299 A    11/2008

(Continued)

*Primary Examiner* — Christopher Stanford
(74) *Attorney, Agent, or Firm* — Oliff PLC (57) ABSTRACT

An irradiation apparatus includes a shielded object detecting unit, an illumination setting unit, an irradiating device, and an illumination controlling unit. The shielded object detecting unit detects a shielded object. Glare is allowable to the shielded object at an upper limit of illumination brightness or less. A driver can visually recognize the shielded object at an lower limit of the illumination brightness or more. The illumination setting unit sets the illumination brightness based on the upper limit and the lower limit of the illumination brightness. The illumination controlling unit controls the irradiating device such that light is emitted in a predetermined irradiation pattern in which a first part of the shielded object is illuminated at the illumination brightness set by the illumination setting unit and a second part of the shielded object is illuminated at a higher illumination brightness than that of the first part.

7 Claims, 6 Drawing Sheets

BRIGHTNESS PERCEIVED BY DRIVER AND PEDESTRIAN

(56) References Cited

U.S. PATENT DOCUMENTS

| | | | | |
|---|---|---|---|---|
| 6,144,158 | A * | 11/2000 | Beam | B60Q 1/085 250/208.1 |
| 6,328,463 | B1 * | 12/2001 | Okubo | F21S 48/1172 362/211 |
| 6,443,603 | B1 * | 9/2002 | Eberhardt | B60Q 1/085 362/464 |
| 6,587,573 | B1 * | 7/2003 | Stam | B60Q 1/085 340/930 |
| 7,512,252 | B2 * | 3/2009 | Otsuka | B60Q 1/1423 382/104 |
| 7,936,904 | B2 * | 5/2011 | Furusawa | G06K 9/00825 362/465 |
| 8,562,192 | B2 * | 10/2013 | Tatara | B60Q 1/12 362/509 |
| 2002/0080618 | A1 * | 6/2002 | Kobayashi | B60Q 1/085 362/466 |
| 2003/0137849 | A1 * | 7/2003 | Alden | B60Q 1/085 362/466 |
| 2006/0038959 | A1 * | 2/2006 | Hull | B60Q 1/085 352/49 |
| 2007/0147055 | A1 * | 6/2007 | Komatsu | B60Q 1/085 362/464 |
| 2012/0299478 | A1 * | 11/2012 | Park | B60Q 1/143 315/82 |
| 2013/0242100 | A1 * | 9/2013 | Seki | B60Q 1/04 348/148 |
| 2014/0003070 | A1 * | 1/2014 | Nakaya | B60Q 1/08 362/466 |
| 2014/0016335 | A1 * | 1/2014 | Cho | B60Q 1/06 362/466 |
| 2015/0009693 | A1 * | 1/2015 | Sekiguchi | B60Q 1/08 362/465 |

FOREIGN PATENT DOCUMENTS

| | | |
|---|---|---|
| JP | 2009090844 A | 4/2009 |
| JP | 2009184642 A | 8/2009 |
| JP | 2011051441 A | 3/2011 |
| JP | 2011084237 A | 4/2011 |
| JP | 2012166652 A | 9/2012 |
| JP | 2013184614 A | 9/2013 |

* cited by examiner

IRRADIATION APPARATUS

INCORPORATION BY REFERENCE

The disclosure of Japanese Patent Application No. 2014-083931, filed on Apr. 15, 2014 including the specification, drawings and abstract, is incorporated herein by reference in its entirety.

BACKGROUND OF THE INVENTION

1. Field of the Invention

The invention relates to an irradiation apparatus, and more particularly to an irradiation device that irradiates a periphery of a host vehicle.

2. Description of Related Art

A control system for a vehicle headlight, which prevents situations in which pedestrians and obstructions cannot be detected by causing a plurality of light emitting diodes (LEDs) to emit pulsed light in synchronization with a shutter of a camera, is available in the related art (Japanese Patent Application Publication No. 2011-084237 (JP 2011-084237 A)).

An in-vehicle image capturing apparatus that synchronizes a shutter of a camera with illumination and shifts a lighting timing for each frame is also available (Japanese Patent Application Publication No. 2008-273299 (JP 2008-273299 A)).

Also available is an illumination apparatus that controls visible light emitting means such that respective small regions in front of a vehicle are irradiated to an illumination condition in which visibility in front of the vehicle is improved (Japanese Patent Application Publication No. 2009-90844 (JP 2009-90844 A)).

Also available is a vehicle headlight system which, when an object of attention is extracted from image frame data, selects a light distribution pattern with which glare can be suppressed in relation to the object of attention (Japanese Patent Application Publication No. 2011-051441 (JP 2011-051441 A)).

Furthermore, a vehicle headlight system that irradiates a region in which an object of interest exists with infrared light instead of visible light illumination is available (Japanese Patent Application Publication No. 2012-166652 (JP 2012-166652 A)).

However, the techniques disclosed in JP 2011-084237 A, JP 2011-051441 A, and JP 2012-166652 A may make it difficult for a driver to recognize a pedestrian visually since shielding is performed.

On the other hand, with the techniques disclosed in JP 2008-273299 A and JP 2009-90844 A, the pedestrian may be dazzled by uncomfortably bright light since shielding is not performed.

SUMMARY OF THE INVENTION

The invention provides an irradiation apparatus with which a driver can visually recognize a shielded object while preventing the shielded object from being dazzled by uncomfortably bright light.

An irradiation apparatus according to an aspect of the invention includes a shielded object detecting unit, an illumination upper limit estimating unit, an illumination lower limit estimating unit, an illumination setting unit, an irradiating device, and an illumination controlling unit. The shielded object detecting unit is configured to detect a shielded object to be shielded from light emitted from the irradiation apparatus. The illumination upper limit estimating unit is configured to estimate an upper limit of an illumination brightness with which the shielded object is irradiated, based on a relative position of the shielded object detected by the shielded object detecting unit relative to a host vehicle. Glare is allowable to the shielded object at the upper limit of the illumination brightness or less. The illumination lower limit estimating unit is configured to estimate a lower limit of the illumination brightness, based on a brightness of a background of the shielded object. A driver of the host vehicle can visually recognize the shielded object at the lower limit of the illumination brightness or more. The illumination setting unit is configured to set the illumination brightness, based on the upper limit of the illumination brightness estimated by the illumination upper limit estimating unit and the lower limit of the illumination brightness estimated by the illumination lower limit estimating unit. The irradiating device is configured to irradiate a periphery of the host vehicle with light in an irradiation pattern. The illumination controlling unit is configured to control the irradiating device based on the relative position relative to the host vehicle and the illumination brightness set by the illumination setting unit, such that light is emitted in a predetermined irradiation pattern in which a first part of the shielded object is illuminated at the illumination brightness set by the illumination setting unit and a second part of the shielded object is illuminated at a higher illumination brightness than the illumination brightness set by the illumination setting unit when seen from the host vehicle, the second part not including the first part.

According to the aspect of the invention, the light is emitted in the predetermined irradiation pattern in which the first part of the shielded object is illuminated at the illumination brightness set by the illumination setting unit and the second part of the shielded object is illuminated at the higher illumination brightness than that of the first part. As a result, the driver can visually recognize the shielded object without the shielded object being dazzled by uncomfortably bright light.

In the aspect of the invention, the illumination setting unit may be configured to set the illumination brightness to be between the upper limit of the illumination brightness estimated by the illumination upper limit estimating unit and the lower limit of the illumination brightness estimated by the illumination lower limit estimating unit.

The irradiation apparatus according to the aspect of the invention may further include a visible light image capturing device configured to capture a visible light image representing the periphery of the host vehicle. In addition, the illumination lower limit estimating unit may be configured to estimate the lower limit of the illumination brightness based on the brightness of the background of the shielded object on the visible light image captured by the visible light image capturing device.

Furthermore, in the above configuration, the shielded object detecting unit may be configured to detect the shielded object based on the visible light image captured by the visible light image capturing device. In addition, the illumination controlling unit may be configured to control the irradiating device to emit light without shielding the shielded object at a first timing at which the visible light image is captured. In addition, the illumination controlling unit may be configured to control the irradiating device to emit light in the predetermined irradiation pattern at a second timing different from the first timing. According to this configuration, a reduction in the precision with which the shielded object is detected from the visible light image can be prevented.

The irradiation apparatus according to the aspect of the invention may further include a three-dimensional position measuring device and a position estimating unit configured to estimate. The three-dimensional position measuring device is configured to measure a three-dimensional position of an object existing on the periphery of the host vehicle. The position estimating unit is configured to estimate, based on the three-dimensional position measured by the three-dimensional position measuring device, a relative three-dimensional position of the shielded object detected by the shielded object detecting unit relative to the host vehicle. In addition, the illumination upper limit estimating unit may be configured to estimate the upper limit of the illumination brightness based on the relative three-dimensional position estimated by the position estimating unit.

Furthermore, the irradiation apparatus according to the aspect of the invention may further include an illumination database, a shielded object illumination calculating unit, an angle estimating unit, and an adaptation luminance estimating unit. The illumination database stores illumination brightness values determined in advance in relation to respective relative three-dimensional positions relative to the host vehicle. The shielded object illumination calculating unit is configured to calculate, based on the relative three-dimensional position estimated by the position estimating unit and the illumination brightness values stored in the illumination database, an illumination brightness to be applied to the shielded object. The angle estimating unit is configured to estimate, based on the relative three-dimensional position estimated by the position estimating unit, an angle formed by an orientation of the shielded object and an irradiation direction in which the irradiating device emits light. The adaptation luminance estimating unit is configured to estimate an adaptation luminance of the shielded object. In addition, the illumination upper limit estimating unit may be configured to estimate the upper limit of the illumination brightness based on the illumination brightness calculated by the shielded object illumination calculating unit, the angle estimated by the angle estimating unit, and the adaptation luminance estimated by the adaptation luminance estimating unit.

With the irradiation apparatus according to aspects of the invention described above, the illumination brightness with which the shielded object is irradiated is set based on the estimated upper limit of the illumination brightness and the estimated lower limit of the illumination brightness. Furthermore, light is emitted in the predetermined irradiation pattern in which the first part of the shielded object is illuminated at the illumination brightness set by the illumination setting unit when seen from the host vehicle. As a result, the driver can visually recognize the shielded object without the shielded object being dazzled by uncomfortably bright light.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment of an irradiation apparatus according to the invention will be described in detail below with reference to the drawings.

Figure 1:
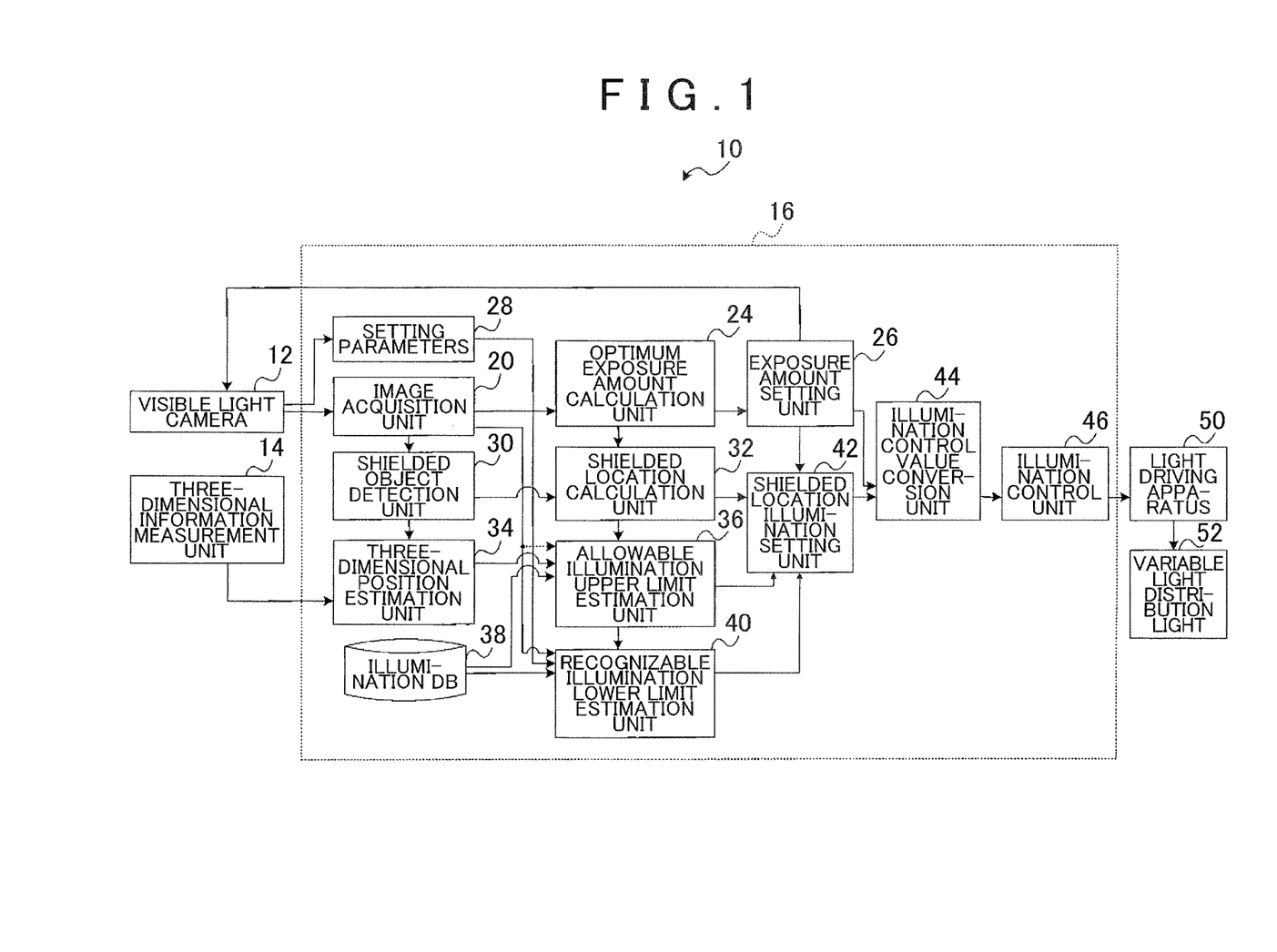
FIG. 1 is a block diagram showing an irradiation apparatus according to an embodiment of the invention.

As shown in FIG. 1, an irradiation apparatus 10 according to this embodiment is attached to a vehicle and provided with a visible light camera 12, a three-dimensional information measurement unit 14, and a control apparatus 16.

The visible light camera 12 captures an image of the front of a host vehicle, and outputs a visible light image obtained from the image capture operation. The visible light camera 12 is connected to the control apparatus 16.

The three-dimensional information measurement unit 14 measures a three-dimensional position of an object existing in front of the host vehicle relative to the host vehicle, and outputs information indicating the measured three-dimensional position. A 3D sensor such as a laser radar, a stereo camera, or a mobile stereo camera may be used as the three-dimensional information measurement unit 14. Note that the three-dimensional information measurement unit 14 may execute an image processing algorithm in which a three-dimensional position is estimated using a single lens camera under assumptions that a road is flat and so on. The three-dimensional information measurement unit 14 is connected to the control apparatus 16.

The control apparatus 16 is constituted by a microcomputer including a CPU, a read-only memory (ROM) that stores programs of various processing routines, and a random access memory (RAM) that stores data temporarily. When the microcomputer that executes a control routine to be described below is expressed in terms of function blocks, the control apparatus 16 may be represented by an image acquisition unit 20, an optimum exposure amount calculation unit 24, an exposure amount setting unit 26, a setting parameter acquisition unit 28, a shielded object detection unit 30, a shielded location calculation unit 32, a three-dimensional position estimation unit 34, an allowable illumination upper limit estimation unit 36, an illumination database 38, a recognizable illumination lower limit estimation unit 40, a shielded location illumination setting unit 42, an illumination control value conversion unit 44, and an illumination control unit 46. The visible light camera 12 is connected to the image acquisition unit 20 and the setting parameter acquisition unit 28, the three-dimensional information measurement unit 14 is connected to the shielded object detection unit 30, and a light driving apparatus 50 is connected to the illumination control unit 46. The light driving apparatus 50 and a variable light distribution light 52 are examples of an irradiating device.

The image acquisition unit 20 acquires a captured image from the visible light camera 12. The optimum exposure amount calculation unit 24 calculates an optimum amount of exposure for detecting a shielded object based on the image acquired by the image acquisition unit 20. The exposure amount setting unit 26 sets the exposure amount calculated by the optimum exposure amount calculation unit 24 so that the exposure amount is realized by the visible light camera 12. More specifically, the exposure amount setting unit 26 adjusts an opening time of a diaphragm shutter of the visible light camera 12.

The setting parameter acquisition unit 28 acquires, from the visible light camera 12, parameters (for example, an aperture, a shutter opening time, a gain, and so on) required to calculate a pixel value of an image from an illumination brightness.

The shielded object detection unit 30 detects a pedestrian serving as the shielded object from the image acquired by the image acquisition unit 20. Note that a conventional method such as pattern matching may be used as a pedestrian detection method, and therefore detailed description of the method has been omitted.

The shielded location calculation unit 32 calculates an image coordinate position of a head portion serving as a shielded location of the pedestrian detected by the shielded object detection unit 30.

The three-dimensional position estimation unit 34 estimates a three-dimensional position of the detected pedestrian relative to the host vehicle by obtaining a correspondence between the pedestrian detection result obtained by the shielded object detection unit 30 and the measurement result obtained by the three-dimensional information measurement unit 14.

The allowable illumination upper limit estimation unit 36 estimates an upper limit of an illumination brightness applied to the shielded object at which glare is allowable to the pedestrian based on the three-dimensional position of the detected pedestrian relative to the host vehicle, estimated by the three-dimensional position estimation unit 34, and the illumination database 38.

The illumination database 38 stores, on a three-dimensional coordinate system using the host vehicle as a reference, data from which an illuminance of any desired three-dimensional position in front of the host vehicle can be calculated. For example, a space in front of the host vehicle is divided into desired shapes, and a table on which illuminance values calculated in advance are allocated to the respective shapes is stored in the illumination database 38.

The illumination database 38 also stores a number of lights of the host vehicle, and three-dimensional coordinate system positions of each light using the host vehicle as a reference. The illumination database 38 stores a calculation coefficient for converting the illuminance of each three-dimensional position in front of the host vehicle into a pixel value of an image.

The recognizable illumination lower limit estimation unit 40 estimates a lower limit of the illumination brightness applied to the shielded object at which a driver of the host vehicle can visually recognize the pedestrian serving as the shielded object based on the image acquired by the image acquisition unit 20, the parameters acquired by the setting parameter acquisition unit 28, and the illumination database 38. More specifically, the lower limit is estimated as follows.

First, a brightness of a background of the pedestrian on the image is calculated. A subject brightness at which a contrast enabling visual recognition is achieved relative to the determined brightness of the background is then determined using a method described in Reference Document (Aoki, Morita, Sekine, Tanaka: "Visibility of Pedestrians using Headlights in consideration of Glare experienced by Oncoming Vehicles", Collected Papers, Society of Automotive Engineers of Japan Inc., 44-1, pp. 131-136, 2013). A lower limit of the determined subject brightness is then estimated as the lower limit of the illumination brightness applied to the shielded object.

Figure 2:
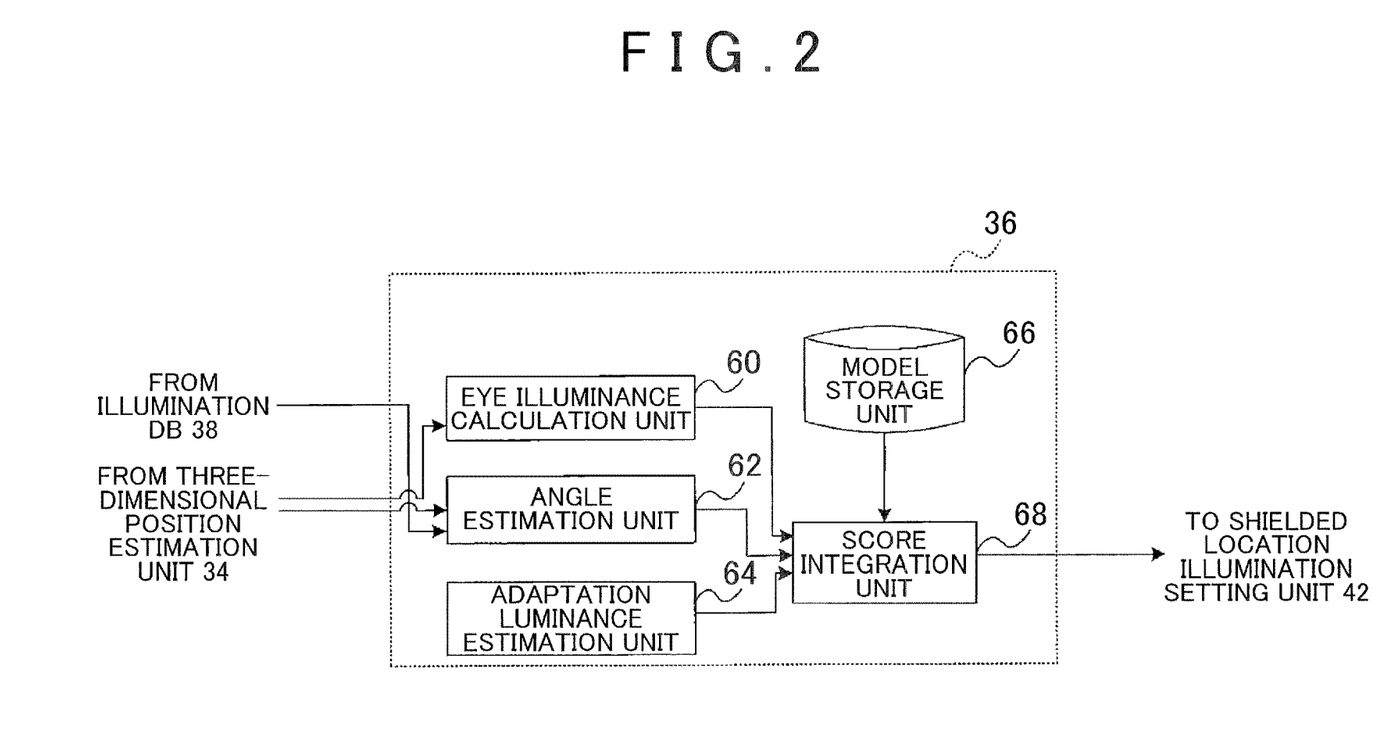
FIG. 2 is a block diagram showing an allowable illumination upper limit estimation unit of the irradiation apparatus according to this embodiment of the invention.

A configuration of the allowable illumination upper limit estimation unit 36 will now be described in detail using FIG. 2. The allowable illumination upper limit estimation unit 36 includes an eye illuminance calculation unit 60, an angle estimation unit 62, an adaptation luminance estimation unit 64, a model storage unit 66, and an allowable illumination upper limit calculation unit 68.

The eye illuminance calculation unit 60 calculates an eye illuminance of the pedestrian serving as the shielded object by cross-checking the three-dimensional position of the head portion of the pedestrian serving as the shielded object, estimated by the three-dimensional position estimation unit 34, with the illumination database 38.

The angle estimation unit 62 calculates an angle formed by a sight line of the pedestrian serving as the shielded object when looking at the host vehicle and a lamp direction based on the three-dimensional position of the head portion of the pedestrian serving as the shielded object, estimated by the three-dimensional position estimation unit 34, and the three-dimensional coordinate system positions of the respective lights using the host vehicle as a reference, stored in the illumination database 38.

The adaptation luminance estimation unit 64 estimates an adaptation luminance of the pedestrian serving as the shielded object. Strictly speaking, the adaptation luminance of the pedestrian cannot be measured, and therefore, in this embodiment, the adaptation luminance is estimated as an approximate value from the brightness of the periphery of the shielded object on the image acquired by the image acquisition unit 20. Alternatively, an adaptation value corresponding to a current condition may be selected from a plurality of typical values corresponding to respective conditions.

The model storage unit 66 stores a formula for estimating a degree of glare experienced by the pedestrian serving as the shielded object from a measurable physical quantity as a glare model formula. In this embodiment, the Schmidt-Clausen model formula illustrated below is used as a representative model formula.

$$W = 5 - 2\log \sum_{i=1}^{n} \frac{E_{Bi}}{C_{poo}\left[1 + \sqrt{\frac{L_u}{C_{pL}}}\right]\theta_i^{0.46}} \quad \text{[Formula 1]}$$

Here, n is the number of lamps, $E_B$ is the eye illuminance (1×) of the pedestrian, $L_u$ is the adaptation luminance (cd/m²) of the pedestrian, and θ is the angle (min) formed by the sight line of the pedestrian and the lamp direction. Further, $C_{POO}=3.0\times10^{-3}$ 1 ×min$^{-0.46}$, $C_{pL}=4.0\times10^{-2}$ cd/m².

Note that the above model formula is the model formula described in Reference Document (H. J. Schmidt-Clausen, J. Th. H. Bindels, "Assessment of discomfort glare in motor vehicle lighting", Lighting Research and Technology, vol. 6, no. 2, pp. 79-88, 1974), and therefore detailed description thereof has been omitted.

The allowable illumination upper limit calculation unit 68 estimates the upper limit of the illumination brightness applied to the shielded object at which glare is allowable to the pedestrian in accordance with the above model formula based on the eye illuminance of the pedestrian, calculated by the eye illuminance calculation unit 60, the angle formed by the sight line of the pedestrian and the lamp direction, estimated by the angle estimation unit 62, and the adaptation luminance estimated by the adaptation luminance estimation unit 64.

The shielded location illumination setting unit 42 generates a light distribution pattern for shielding the head portion of the pedestrian, which serves as the shielded location when seen from the host vehicle, based on the three-dimensional position of the shielded location, calculated by the shielded location calculation unit 32.

Further, the shielded location illumination setting unit 42 sets the illumination brightness to be applied to the three-dimensional position of the shielded location based on the three-dimensional position of the shielded location, calculated by the shielded location calculation unit 32, the upper limit of the illumination brightness applied to the shielded object, estimated by the allowable illumination upper limit estimation unit 36, and the lower limit of the illumination brightness applied to the shielded object, estimated by the recognizable illumination lower limit estimation unit 40.

Figure 3A:
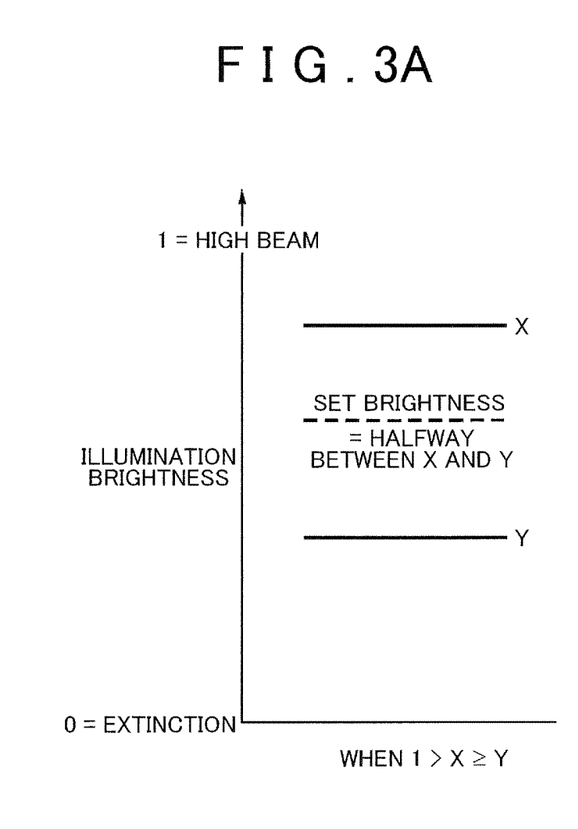
FIG. 3A and FIG. 3B are views illustrating a method of setting an illumination brightness applied to a three-dimensional (3D) position of a shielded location.
Figure 3B:
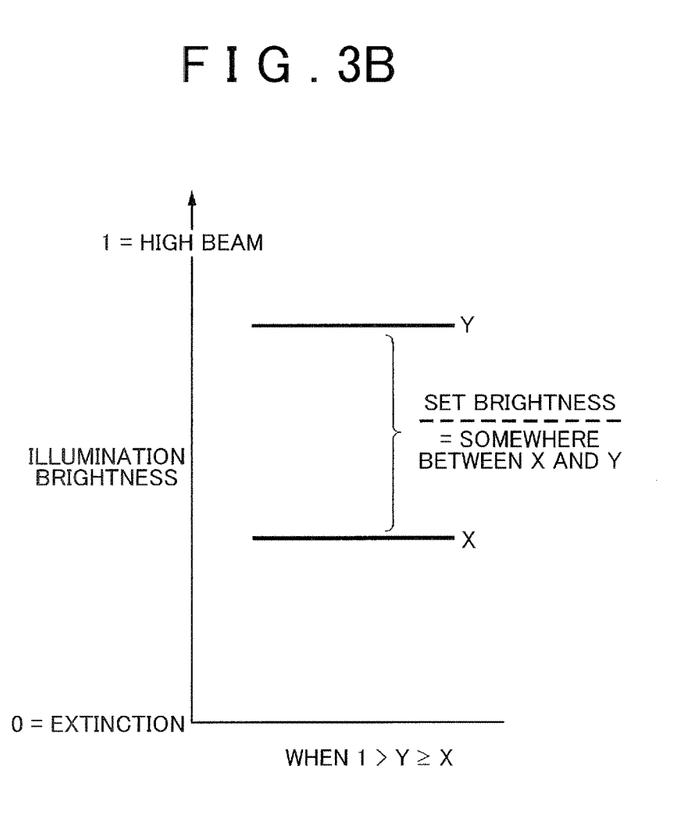

The illumination brightness set here does not in principle affect the image used to detect the pedestrian, and to enable the driver to recognize the pedestrian visually, the illumination brightness is preferably maximized. Therefore, as the illumination brightness to be applied to the three-dimensional position of the shielded location, the shielded location illumination setting unit 42 sets a brightness halfway between an upper limit X of the illumination brightness applied to the shielded object at which allowable glare is realized and a lower limit Y of the illumination brightness applied to the shielded object at which the driver can visually recognize the pedestrian serving as the shielded object, for example (see FIG. 3A). Further, when the upper limit X of the illumination brightness applied to the shielded object is equal to or lower than the lower limit Y of the illumination brightness applied to the shielded object (when 1>Y>X, where 1 is a brightness under a high beam), the illumination brightness to be applied to the three-dimensional position of the shielded location is set between the upper limit of the illumination brightness applied to the shielded object and the lower limit of the illumination brightness applied to the shielded object in a decision taken at a design stage (see FIG. 3B). For example, a determination is made based on design criteria as to whether to prioritize the visibility of the driver or reduction of the discomfort experienced by the pedestrian, and based on this design decision, the illumination brightness to be applied to the three-dimensional position of the shielded location is set between the upper limit of the illumination brightness applied to the shielded object and the lower limit of the illumination brightness applied to the shielded object.

Figure 4:
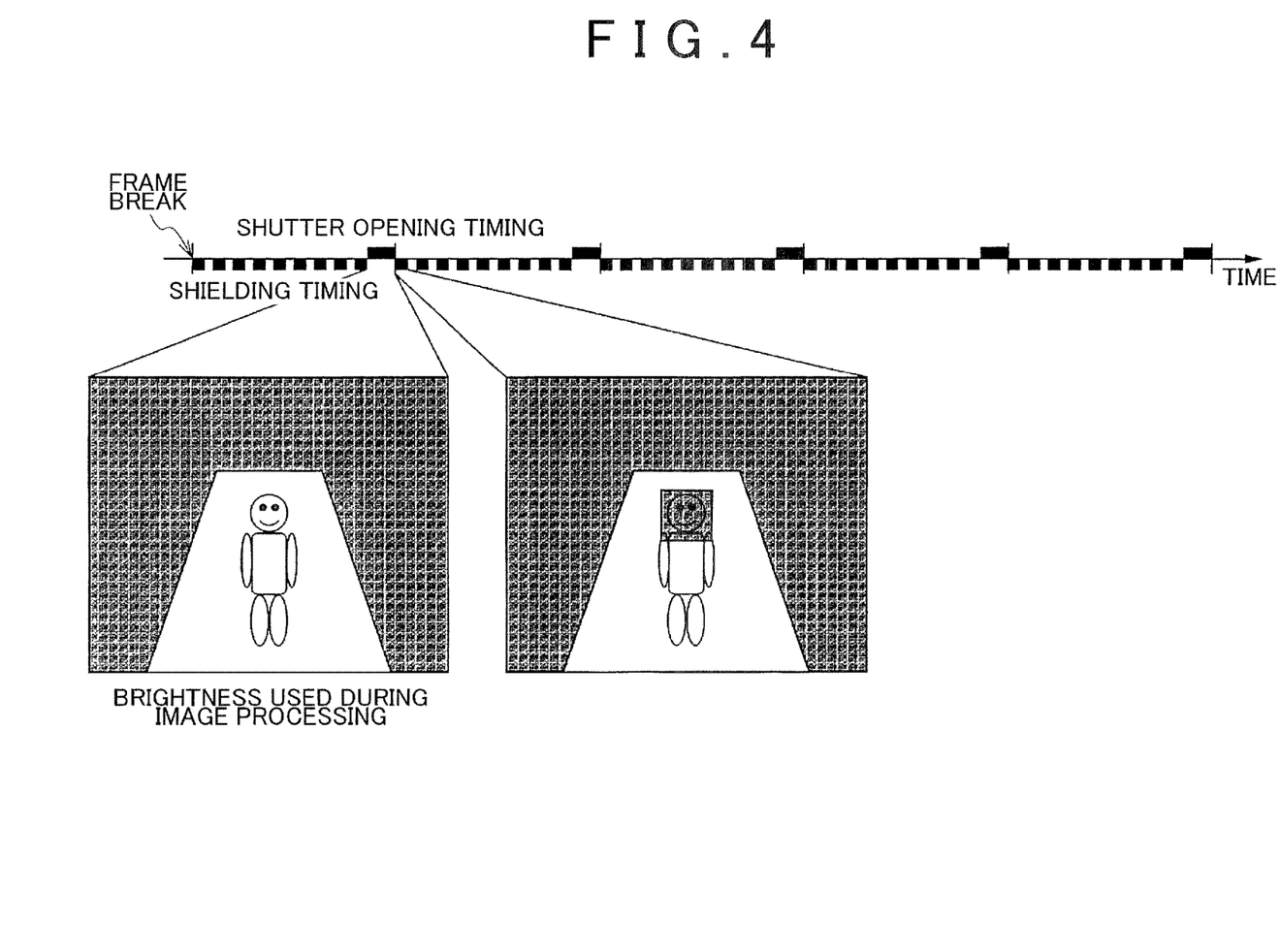
FIG. 4 is a view showing a shielding timing and a shutter release timing.
Figure 5:
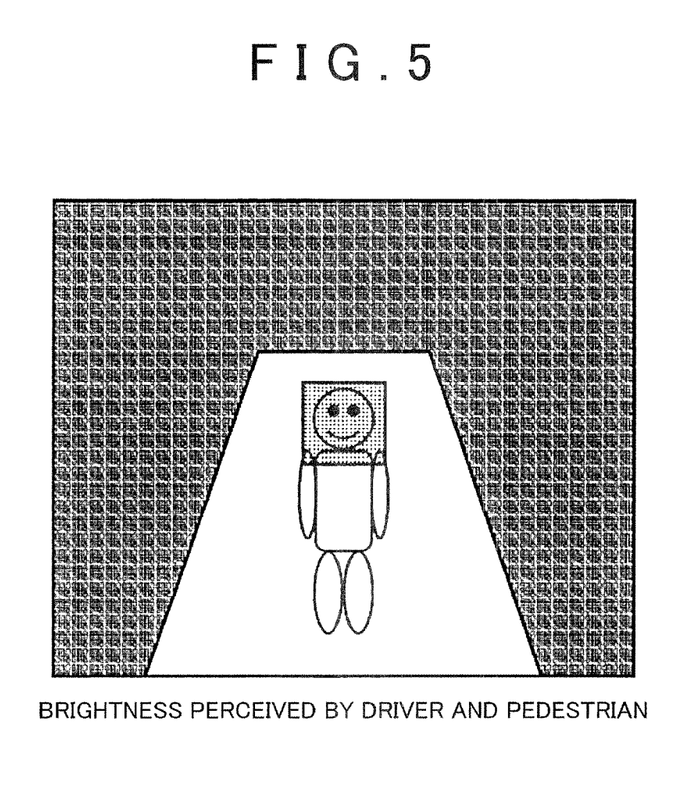
FIG. 5 is a view illustrating a brightness perceived by a driver and a pedestrian.

The illumination control value conversion unit 44 creates a command value for the illumination control unit 46 that controls the light driving apparatus 50 based on the setting performed by the exposure amount setting unit 26 and the illumination brightness to be applied to the three-dimensional position of the shielded location, set by the shielded location illumination setting unit 42, in order to realize the set illumination brightness to be applied to the three-dimensional position of the shielded location. Several realization methods may be employed, but when the variable light distribution light 52 is an illumination device in which each cell can only be switched On and Off, as shown in FIG. 4, for example, the set illumination brightness to be applied to the three-dimensional position of the shielded location is realized at an intermediate brightness on a light distribution pattern by creating a command value for switching the respective cells On and Off rapidly (see FIG. 5).

The illumination control unit 46 performs control via the light driving apparatus 50 in accordance with the command value created by the illumination control value conversion unit 44 such that light is emitted in the light distribution pattern by the variable light distribution light 52.

The variable light distribution light 52 is a light that is bright enough to serve as a light source of a headlight, has a similarly high spatial resolution in vertical and horizontal directions to a PC projector, and has cells that can be switched On and Off. The variable light distribution light 52 is constituted by a lamp and a light distribution control apparatus that controls a light distribution of light emitted from the lamp, for example. The light distribution control apparatus may be constituted by a reflection type spatial light modulation element such as a digital micromirror device (a DMD) that controls the light distribution by reflecting the light from the lamp, or a transmission type spatial light modulation element such as a liquid crystal display element that controls the light distribution by transmitting the light from the lamp. Further, a lamp on which LEDs are arranged in matrix form may be used.

With the variable light distribution light 52, a predetermined light distribution pattern can be obtained either by lighting the lamp so that the predetermined light distribution pattern is obtained or by driving the light distribution control apparatus while the lamp is lit so that the predetermined light distribution pattern is obtained.

The light driving apparatus 50 controls the light distribution (an irradiation pattern) and the brightness of the light emitted from the variable light distribution light 52 based on an instruction from the illumination control unit 46, and drives the variable light distribution light 52 so that the light is emitted while switching between a light distribution pattern that includes the shielded location and a full lighting pattern. The light distribution pattern including the shielded location and the full lighting pattern are switched at a frequency at which flickering is not experienced, for example. The brightness perceived by the driver and the pedestrian is a time-weighted average of the brightness of the shielded location and the brightness of the lighting.

Note that emitting light while switching between the light distribution pattern including the shielded location and the full lighting pattern is an example of emitting light in an irradiation pattern in which a part of the shielded object when seen from the host vehicle is illuminated at the set illumination brightness to be applied to the three-dimensional position of the shielded location, and a region including a remaining part of the shielded object is illuminated at a higher brightness than the set brightness.

Figure 6:
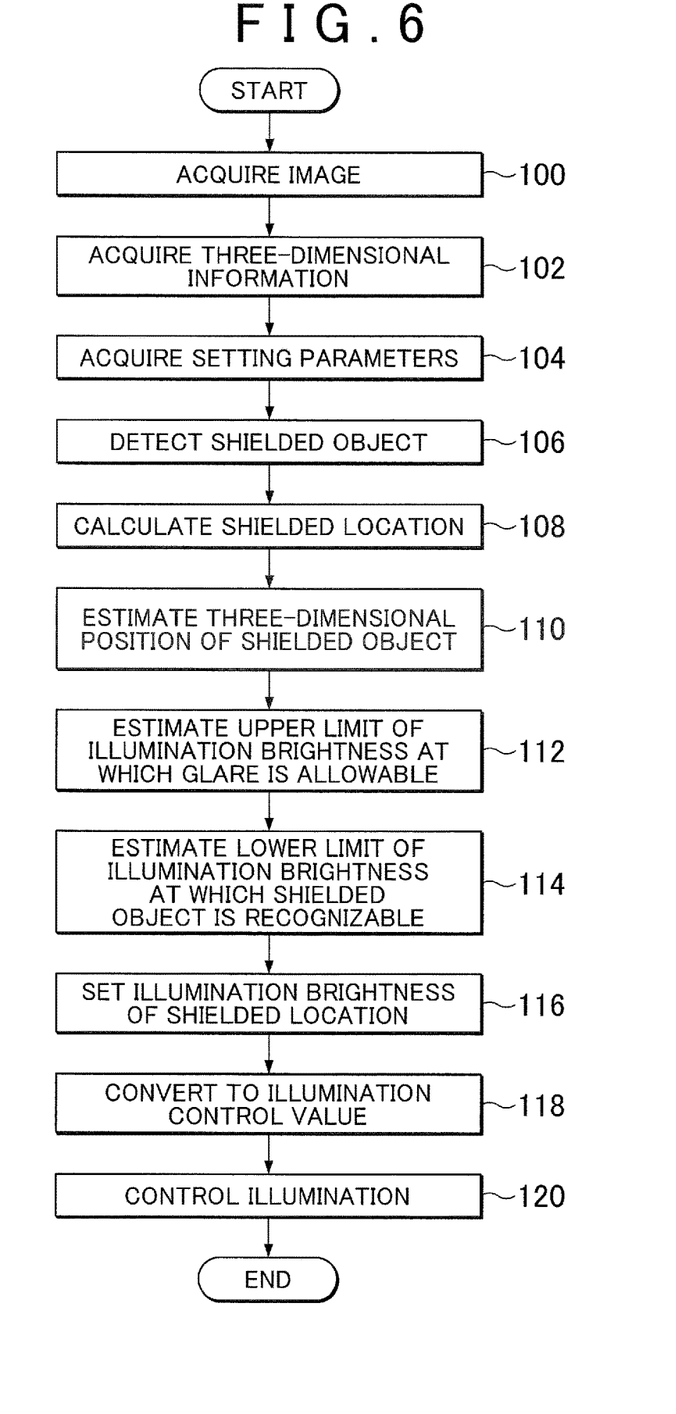
FIG. 6 is a flowchart showing a control routine executed by a central processing (CPU) of a control apparatus provided in the irradiation apparatus according to this embodiment of the invention.

FIG. 6 is a flowchart showing a control routine executed by the CPU of the control apparatus 16 provided in the irradiation apparatus 10 according to this embodiment.

The lamp of the variable light distribution light 52 is lit by the light driving apparatus 50 when a power supply (not shown) is introduced into the irradiation apparatus 10 so that at a shielding timing shown in FIG. 4, light is emitted while switching between the light distribution pattern including the shielded location and the full lighting pattern. At this time, the processing routine shown in FIG. 6 is executed repeatedly.

First, in step 100, the visible light camera 12 is driven at a shutter release timing (a timing at which light is emitted in the full lighting pattern) shown in FIG. 4 such that the shutter thereof is released, and a visible light image obtained by capturing an image of the front of the host vehicle is taken in. Next, in step 102, three-dimensional information relating to an object existing in front of the host vehicle, measured by the three-dimensional information measurement unit 14, is acquired.

In step 104, the setting parameters of the visible light camera 12 are acquired. In step 106, the pedestrian serving as the shielded object is detected from the visible light image acquired in step 100. In step 108, the image coordinate position of the head portion serving as the shielded location of detected pedestrian is calculated based on the pedestrian detection result acquired in step 106.

Next, in step 110, the three-dimensional position of the head portion serving as the shielded location is estimated based on the three-dimensional information acquired in step 102 and the image coordinate position of the head portion serving as the shielded location, calculated in step 108.

In step 112, the upper limit of the illumination brightness applied to the shielded object at which glare is allowable to the pedestrian is estimated based on the visible light image acquired in step 100, the three-dimensional position of the head portion serving as the shielded location, estimated in step 110, and the illumination database 38.

Next, in step 114, the lower limit of the illumination brightness applied to the shielded object at which the driver can visually recognize the pedestrian is estimated based on the visible light image acquired in step 100, the setting parameters acquired in step 104, and the illumination database 38.

Then, in step 116, a light distribution pattern in which the head portion of the pedestrian, serving as the shielded location, is shielded when seen from the host vehicle is set based on the three-dimensional position of the head portion serving as the shielded location, estimated in step 110. Further, the illumination brightness to be applied to the shielded location is set based on the upper limit of the illumination brightness applied to the shielded object, estimated in step 112, and the lower limit of the illumination brightness applied to the shielded object, estimated in step 114.

Next, in step 118, a command value is created for the illumination control unit 46 that controls the light driving apparatus 50 based on the light distribution pattern and the illumination brightness to be applied to the shielded location, set in step 116. In step 120, the variable light distribution light 52 is controlled via the light driving apparatus 50 in accordance with the command value created by the illumination control value conversion unit 44.

In the processing routine described above, light is emitted by the variable light distribution light 52 while switching rapidly between the full lighting pattern not including the shielded location and the light distribution pattern including the shielded location. As a result, the driver perceives a brightness between the upper limit of the illumination brightness applied to the shielded object and the lower limit of the illumination brightness applied to the shielded object in the head portion of the pedestrian serving as the shielded location. The pedestrian serving as the shielded object perceives a brightness between the upper limit of the illumination brightness applied to the shielded object and the lower limit of the illumination brightness applied to the shielded object.

Further, the optimum amount of exposure for detecting the shielded object is calculated based on the visible light image acquired in the processing routine described above, and the calculated amount of exposure is realized by the visible light camera 12.

In the irradiation apparatus according to this embodiment of the invention, as described above, the illumination brightness to be applied to the shielded object is set based on the estimated upper limit of the illumination brightness with which the shielded object is irradiated and the estimated lower limit of the illumination brightness with which the shielded object is irradiated, and light is emitted while switching between the light distribution pattern that includes the shielded location and the full lighting pattern so that the brightness of the head portion of the pedestrian, serving as the shielded location, when seen from the host vehicle corresponds to the set illumination brightness with which the shielded object is to be irradiated. As a result, the driver can visually recognize the pedestrian without the pedestrian being dazzled by uncomfortably bright light.

Further, the shielded object is detected by acquiring an image using a timing at which light is emitted in the full lighting pattern as the image capture timing of the visible light camera, and therefore the pedestrian is not shielded while the shutter is open. As a result, a reduction in the precision with which the shielded object is detected from the visible light image can be prevented.

Furthermore, in a normal method of detecting a pedestrian, either an image obtained while performing shielding is used as learned data, or a method with which the pedestrian can be detected even when his/her face is partially hidden is applied. In both cases, however, the detection performance deteriorates in comparison with a case in which shielding is not performed, and therefore shielding is preferably not performed. In this embodiment, the pedestrian is not shielded while the shutter is open, and therefore deterioration of the shielded object detection performance can be avoided.

Moreover, when the head portion of the pedestrian is shielded, the driver can see only the trunk of the pedestrian from the neck downward. However, the face provides an important clue when detecting a pedestrian, and is therefore preferably not shielded. In this embodiment, the head portion of the pedestrian is irradiated such that the driver perceives the head portion at a brightness that is halfway between a fully lit condition and a shielded condition, and therefore the driver can visually recognize the pedestrian.

Note that in this embodiment, an example of a case in which the set illumination brightness to be applied to the three-dimensional position of the shielded location is realized by emitting light while switching between the light distribution pattern including the shielded location and the full lighting pattern was described. The invention is not limited thereto, however, and instead, light may be emitted in the light distribution pattern including the shielded location using the brightness of the shielded location when irradiated with light in the light distribution pattern as the set illumination brightness to be applied to the three-dimensional position of the shielded location. In this case, the light distribution pattern may be switched to the full lighting pattern at the shutter release timing. For example, the variable light distribution light is a light in which each cell can be set at multiple gradations of brightness, and the illumination control unit sets the brightness of the corresponding cells of the variable light distribution light.

What is claimed is:

1. An irradiation apparatus comprising:
    an irradiating device configured to irradiate a periphery of a host vehicle with light in an irradiation pattern; and a processor programmed to:
  detect a relative position of a shielded object to be shielded from light emitted from the irradiation device relative to the host vehicle;
  estimate an upper limit of an illumination brightness with which the shielded object is to be irradiated, based on the detected relative position of the shielded object, wherein glare is allowable to the shielded object at the upper limit of the illumination brightness or less;
  estimate a lower limit of the illumination brightness, based on a brightness of a background of the shielded object, wherein a driver of the host vehicle can visually recognize the shielded object at the lower limit of the illumination brightness or more;
  set the illumination brightness, based on the estimated upper limit of the illumination brightness and the estimated lower limit of the illumination brightness; and
  determine an illumination control value based on the detected relative position to the host vehicle and the set illumination brightness;
  control the irradiating device based on the determined control value, such that light is emitted in a predetermined irradiation pattern in which a first part of the shielded object is illuminated at the set illumination brightness and a second part of the shielded object is simultaneously illuminated at a higher illumination brightness than the set illumination brightness when seen from the host vehicle, the second part not including the first part.

2. The irradiation apparatus according to claim 1, wherein the processor is programmed to set the illumination brightness to be between the estimated upper limit of the illumination brightness and the estimated lower limit of the illumination brightness.

3. The irradiation apparatus according to claim 1, further comprising a visible light image capturing device configured to capture a visible light image representing the periphery of the host vehicle,
  wherein the processor is programmed to estimate the lower limit of the illumination brightness based on the brightness of the background of the shielded object on the visible light image captured by the visible light image capturing device.

4. The irradiation apparatus according to claim 3, wherein the processor is programmed to:
  detect the shielded object based on the captured visible light image,
  control the irradiating device to emit light without shielding the shielded object at a first timing at which the visible light image is captured, and
  control the irradiating device to emit light in the predetermined irradiation pattern at a second timing different from the first timing.

5. The irradiation apparatus according to claim 1, further comprising:
  a three-dimensional position measuring device configured to measure a three-dimensional position of an object existing on the periphery of the host vehicle, wherein processor is configured to:
    estimate, based on the measured three-dimensional position, a relative three-dimensional position of the shielded object relative to the host vehicle, and
    estimate the upper limit of the illumination brightness based on the estimated relative three-dimensional position.

6. The irradiation apparatus according to claim 5, further comprising:
  a memory storing an illumination database that stores illumination brightness values determined in advance in relation to respective relative three-dimensional positions relative to the host vehicle, wherein the processor is programmed to:
    calculate, based on the estimated relative three-dimensional position and the stored illumination brightness values, an illumination brightness to be applied to the shielded object,
    estimate, based on the estimated relative three-dimensional position, an angle formed by an orientation of the shielded object and an irradiation direction in which the irradiating device emits light,
    estimate an adaptation luminance of the shielded object,
    estimate the upper limit of the illumination brightness based on the calculated illumination brightness, the estimated angle, and the estimated adaptation luminance.

7. The irradiation apparatus according to claim 1, wherein the processor is programmed to detect a pedestrian as the shielded object,
  the first part of the shielded object corresponds to a head portion of the pedestrian, and
  the second part of the shielded object corresponds to at least a portion of the pedestrian other than the head portion of the pedestrian.

* * * * *